Aug. 28, 1956 — H. WEINBERG — 2,760,462
APPARATUS FOR WAX-COATING OF PROCESSED PICKLES AND THE LIKE
Filed March 25, 1953 — 2 Sheets-Sheet 1
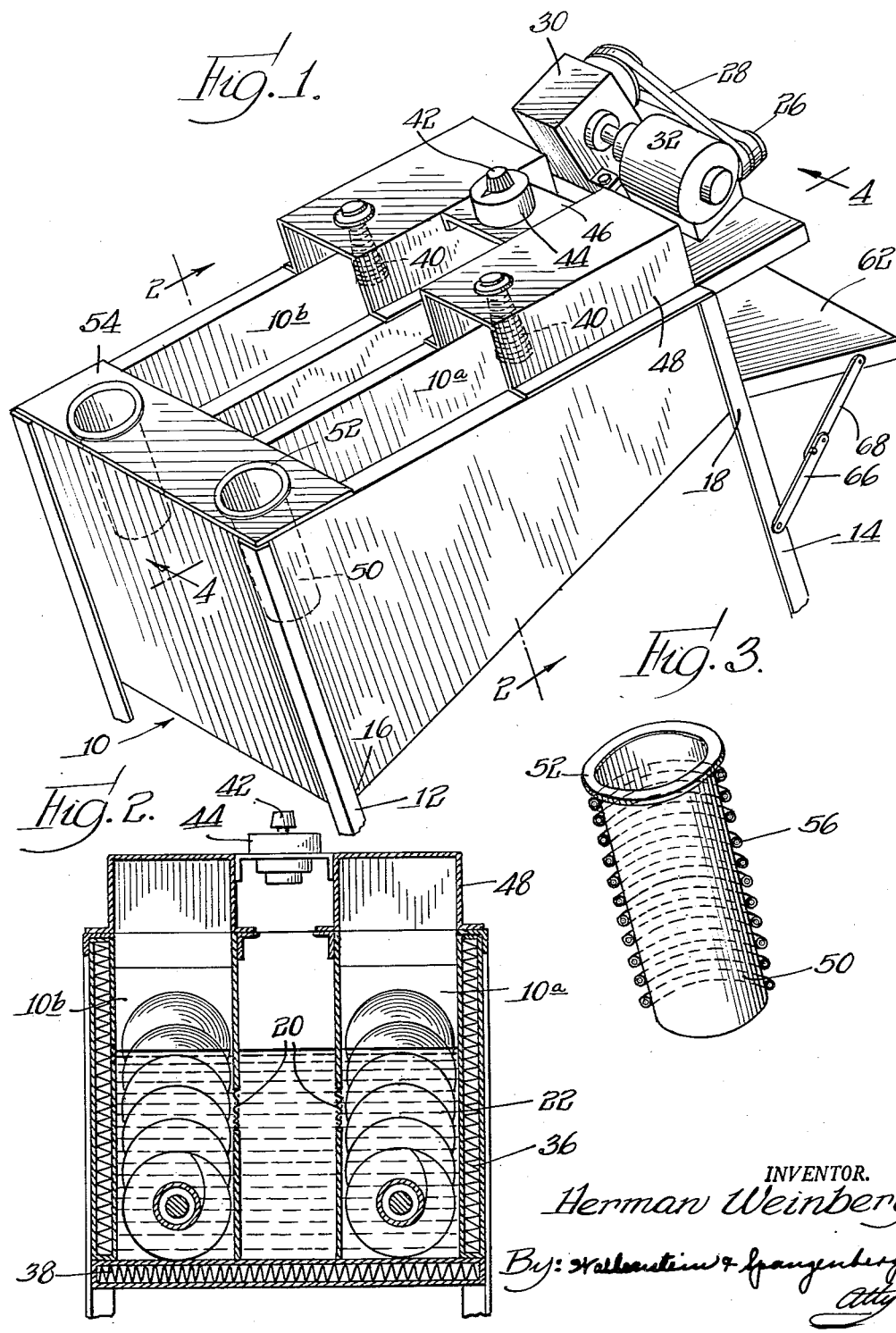

Aug. 28, 1956  H. WEINBERG  2,760,462
APPARATUS FOR WAX-COATING OF PROCESSED PICKLES AND THE LIKE
Filed March 25, 1953   2 Sheets-Sheet 2

INVENTOR.
Herman Weinberg
By: Wallenstein & Spangenberg
Attys.

United States Patent Office 2,760,462
Patented Aug. 28, 1956

2,760,462

APPARATUS FOR WAX-COATING OF PROCESSED PICKLES AND THE LIKE

Herman Weinberg, Evanston, Ill., assignor to The Manhattan Pickle Co., Inc., Chicago, Ill., a corporation of Illinois Application March 25, 1953, Serial No. 344,550

6 Claims. (Cl. 118—20)

This invention relates to a new and useful machine for wax-coating processed pickles and the like.

It has heretofore been proposed to market processed pickles, such as dill pickles, sweet pickles, sour pickles, and the like, in a form where they are encased within a sheath of a waxy material such as carnauba wax, candelilla wax, "Candy" yellow cheese wax, etc., reference being made to U. S. Patent No. 2,577,211. Certain difficulties have been encountered in the commercial marketing of said wax-coated processed pickles due to the fact that the wax coatings have not been uniform and have been characterized by the occasional presence of pinholes. Unless the wax coating is free of such pinholes, the wax-coated processed pickles will deteriorate, spoilage setting in after a number of days. Coating equipment heretofore known and available has not been entirely adequate to meet the various problems that are encountered in the wax coating of processed pickles, said problems involving not only insuring uniformity of coatings free from pinholes but accomplishing such results with a high volume of output, with a minimum of labor costs and a minimum of mechanical difficulties.

In accordance with the present invention, a coating machine has been developed which is most effective in meeting the problems which are involved in the wax-coating of processed pickles. In the accompanying drawings which disclose a particularly preferred embodiment of the invention, Fig. 1 is a perspective view of the coating machine;

Fig. 2 is a vertical section taken along the line 2—2 of Fig. 1;

Fig. 3 is a perspective view of the feed chute with its associated electrically heated coil.

Figure 4:
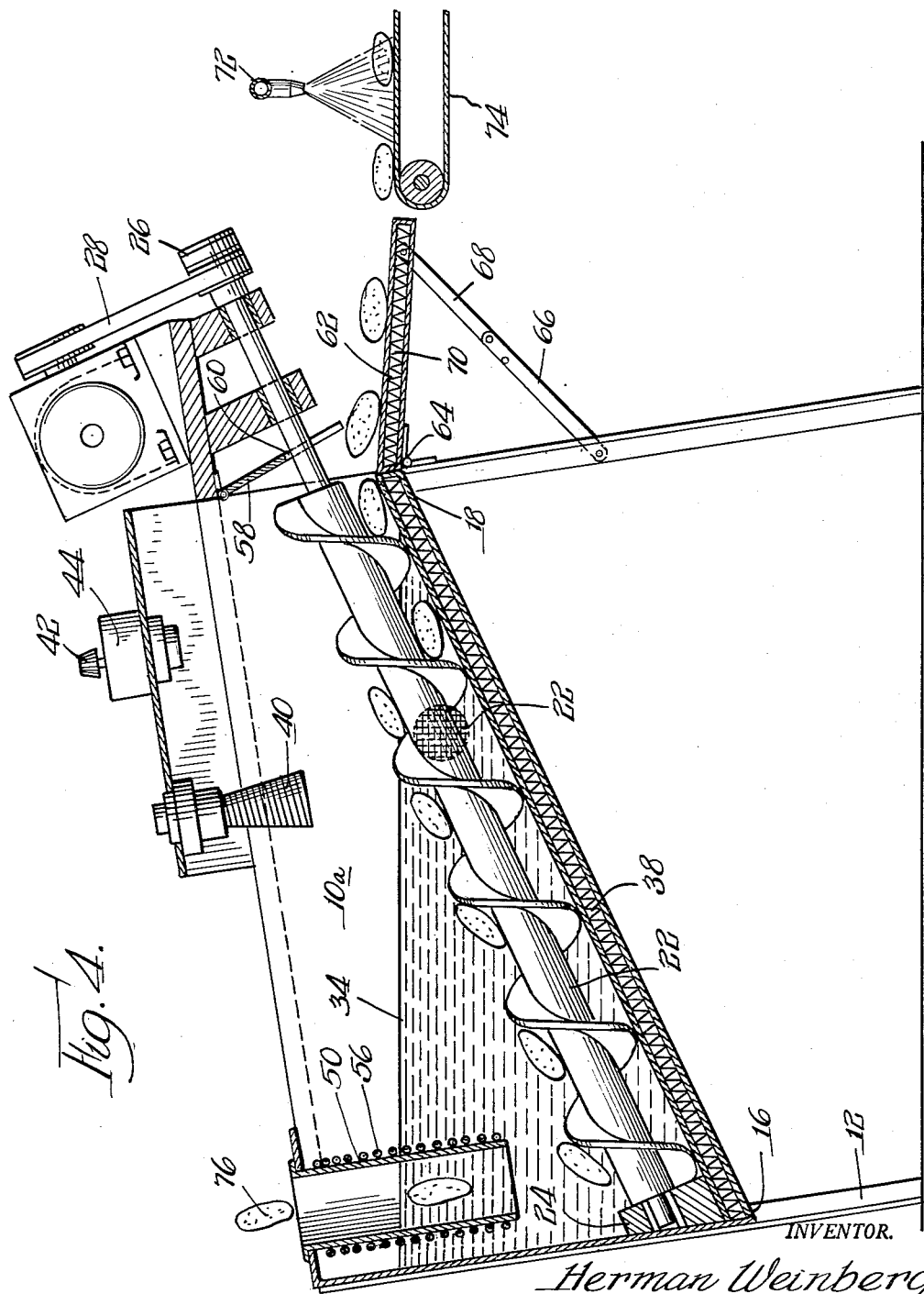
Fig. 4 is a longitudinal section taken along the line 4—4 of Fig. 1.

The wax-coating machine comprises a chamber 10 which may be mounted on front and rear legs 12, 14. The bottom of chamber 10 is inclined upwardly from its front lower end 16 to its rear upper end 18. The chamber 10 may comprise only a single container but, for obtaining increased capacity, it is preferred to utilize a plurality of them, two being shown, for illustrative purposes, in spaced apart arrangement and with their associated equipment, said two individual chambers or containers being denoted by the numerals 10a and 10b. The chambers 10a and 10b communicate through screened openings 20 (see Fig. 2) so as to permit circulation therebetween. Since the chambers 10a and 10b and their associated equipment are identical in construction, it will be sufficient to describe only one of said arrangements.

Disposed adjacent the bottom of the chamber 10a is a spiral conveyor 22 comprising a helix fixed to a shaft the reduced lower end portion of the shaft being mounted, for rotation, in bearing block 24, and the reduced upper end portion of the shaft being mounted in a suitable bearing. The spiral conveyor 22 is driven through a cross belt 26, motor belt 28 being driven by speed reducer 30 through motor 32. The particular mechanism for rotating the spiral conveyor 22 is not material, any suitable arrangement being readily devised. A speed of rotation of the spiral conveyor is suitably of the order of 400 to 500 R. P. M. although it will be understood that the speed is variable. The capacity of the machine is, of course, a function of the speed of rotation of the spiral conveyor.

To maintain the body of wax 34 in molten condition and at a desirable temperature, which is preferably a few degrees above its melting point, heating means is provided. These advantageously comprise electrically operated heating members in the form of side heating units 36, bottom heating units 38 and top heating units 40. The heating members are conveniently controlled through an electrical switch 42 and rheostat 44. The rheostat and switch are mounted on a plate 46 supported between hood members 48 in the form of channels to which the heating units 40 are attached.

At the front end of the machine, a feed chute 50 is supported so as to extend into the chamber 10a. The feed chute is located generally in line with the lower end of the spiral conveyor, the lower end of the feed chute being disposed below the upper level of the body of molten wax. The feed chute is conveniently of tubular shape and is provided with an upper circular flange 52 which rests on a plate or board 54 which is supported on the top of the front of chamber 10, said board 54 having circular apertures therein through which the feed chute extends. The feed chute 50 is provided with a resistance element 56 which is connected to the switch 42 so that said chute is heated at the same time that the other heating members are operated. The heating of the feed chute serves to prevent solidification of the wax in or adjacent to said chute.

At the rear or exit end of the chamber 10a is a pivoted closure member 58 apertured at 60 to permit the upper end of the spiral conveyor shaft to pass therethrough. As the wax-coated pickles move out of the chamber 10a they move the closure member 58 about its pivot. The closure member 58 serves to prevent dissipation of heat from the molten wax bath into the surrounding atmosphere.

Also disposed at the rear or exit end of the chamber 10a is a table 62 which is pivoted at 64 and is supported through links 66, 68. The table is adapted to be heated by means of a resistance element or the like 70 which is operatively connected to the switch 42 and rheostat 44. The heated table enables the wax-coated pickles to slide along the table without disturbing the integrity of the wax coating. Located just beyond the end of said table is a cooling means, which advantageously takes the form of a spray device 72 through which a spray of a fluid such as water may be projected against the wax-coated pickles to effect congelation of the wax as the wax-coated pickles pass along the conveyor belt 74 after their discharge from the table 62.

In the use of the above-described coating apparatus, the processed pickles 76 are dropped through the feed chute 50 into the body of molten wax 34. The pickles are moved through the molten wax by the spiral conveyor and thence onto the heated table 62 which is maintained at a temperature slightly above the melting point of the wax. After the wax-coated pickles pass onto conveyor belt 74, they are sprayed with cold water which serves to effect prompt congelation of the wax coating.

What I claim as new and desire to protect by Letters Patent of the United States is:

1. In a coating machine of the character described, for the coating of processed pickles and the like with a wax, a chamber adapted to hold a body of molten wax, a conveyor supported within said chamber, means to maintain the wax in a molten state, means for feeding the processed pickles and the like to be coated into the molten waxy material disposed in said chamber, said conveyor being adapted to move the processed pickles and the like through said body of molten wax and upwardly out of said body, a heated discharge table onto which the wax-coated processed pickles are discharged from the conveyor after emergence from said body of molten wax, and means for projecting a cold medium onto said wax-coated pickles to effect congelation of said wax.

2. In a coating machine of the character described, for the coating of processed pickles and the like with a wax, a chamber adapted to hold a body of molten wax, a conveyor supported within said chamber, a first portion of said conveyor being adapted to be disposed below the top level of the molten wax in said chamber, means to maintain the wax in a molten state, a feed chute which the processed pickles and the like to be coated are fed into the molten wax disposed in said chamber, said feed chute being located generally in line with said first portion of said conveyor, heating means arranged in proximity to said feed chute to prevent solidification of the wax in or adjacent to said chute, said conveyor being adapted to move the processed pickles and the like through said body of molten wax and upwardly out of said body, a downwardly inclined heated discharge table onto which the wax-coated processed pickles and the like are discharged from the conveyor after emergence from said body of molten wax, and means for effecting congelation of said wax coating on said pickles and the like.

3. In a coating machine of the character described, for the coating of processed pickles and the like with a wax, a chamber adapted to hold a body of molten wax, a conveyor supported within said chamber, a first portion of said conveyor being adapted to be disposed below the top level of the molten wax in said chamber, electrically operated heating means to maintain the wax in a molten state, a feed chute through which the processed pickles and the like to be coated are fed into the molten wax disposed in said chamber, said feed chute being located generally in line with said first portion of said conveyor, electrically operated heating means arranged in proximity to said feed chute to prevent solidification of the wax in or adjacent to said chute, said conveyor being adapted to move the processed pickles and the like through said body of molten wax and upwardly out of said body, a downwardly inclined electrically heated discharge table onto which the wax-coated processed pickles and the like are discharged from the conveyor after emergence from said body of molten wax, and means for projecting a cold medium onto said wax-coated pickles and the like to effect congelation of said wax.

4. In a coating machine of the character described, for the coating of processed pickles and the like with a waxy material, a chamber adapted to hold a body of molten waxy material, the bottom of said chamber being inclined upwardly, a spiral conveyor supported within said chamber, the lower portion of said conveyor being adapted to be disposed below the top level of the molten waxy material in said chamber, electrically operated heating means disposed along the bottom and side walls of said chamber whereby to maintain the waxy composition in a molten state, a feed chute through which the processed pickles and the like to be coated are fed into the molten waxy material disposed in said chamber, said feed chute being located generally in line with the lower end of said spiral conveyor, the lower end of said feed chute being disposed below the upper level of the body of molten waxy material, electrically operated heating means arranged in proximity to said feed chute to prevent solidification of the waxy material in or adjacent to said chute, said spiral conveyor being adapted to move the processed pickles and the like through said body of molten waxy material and upwardly out of said body, a downwardly inclined electrically heated discharge table onto which the wax-coated processed pickles are discharged from the conveyor after emergence from said body of molten wax, and means for spraying cold water onto said wax-coated pickles to effect congelation of said wax.

5. In a coating machine of the character described, for the coating of processed pickles and the like with a wax, a chamber adapted to hold a body of molten wax, the bottom of said chamber being inclined upwardly, a conveyor supported within said chamber, the lower portion of said conveyor being adapted to be disposed below the top level of the molten wax in said chamber, heating means disposed along the bottom and side walls of said chamber whereby to maintain the wax in a molten state, a feed chute through which the processed pickles and the like to be coated are fed into the molten wax disposed in said chamber, said feed chute being located generally in line with the lower end of said conveyor, the lower end of said feed chute being disposed below the upper level of the body of molten wax, heating means arranged in proximity to said feed chute to prevent solidification of the wax in or adjacent to said chute, said conveyor being adapted to move the processed pickles and the like through said body of molten wax and upwardly out of said body, a heated discharge table onto which the wax-coated processed pickles are discharged from the conveyor after emergence from said body of molten wax, and means for spraying cold water onto said wax-coated pickles to effect congelation of said wax.

6. In a coating machine of the character described, for the coating of processed pickles and the like with a wax, a chamber adapted to hold a body of wax, the bottom of said chamber being inclined upwardly, a spiral conveyor supported within said chamber, the lower portion of said conveyor being adapted to be disposed below the top level of the molten wax in said chamber, electrically operated heating means disposed along the bottom and side walls of said chamber whereby to maintain the wax in a molten state, a feed chute through which the processed pickles and the like to be coated are fed into the molten wax disposed in said chamber, said feed chute being located generally in line with the lower end of said spiral conveyor, the lower end of said feed chute being disposed below the upper level of the body of molten wax, electrically operated heating means arranged in proximity to said feed chute to prevent solidification of the wax in or adjacent to said chute, said spiral conveyor being adapted to move the processed pickles and the like through said body of molten wax and upwardly out of said body, a downwardly inclined electrically heated discharge table onto which the wax-coated processed pickles are discharged from the conveyor after emergence from said body of molten wax, and means for spraying cold water onto said wax-coated pickles to effect congelation of said wax.

References Cited in the file of this patent

UNITED STATES PATENTS

| Number | Name | Date |
|---|---|---|
| 1,480,790 | Stanley | Jan. 15, 1924 |
| 1,529,461 | Brogden et al. | Mar. 10, 1925 |
| 1,696,704 | Zellner | Dec. 25, 1928 |
| 2,128,028 | Hampton | Aug. 23, 1938 |
| 2,429,130 | Hockman et al. | Oct. 14, 1947 |
| 2,525,306 | Lunsford | Oct. 10, 1950 |
| 2,578,808 | Johnson et al. | Dec. 18, 1951 |